Patented Jan. 13, 1942

2,270,024

UNITED STATES PATENT OFFICE 2,270,024

EMULSIONS OF THE INTERPOLYMERIZATION PRODUCT OF 2-ETHYL HEXYL METHACRYLATE AND METHYL METHACRYLATE AND TEXTILE FABRICS TREATED THEREWITH

Archibald Renfrew and William Elliott Frew Gates, Norton-on-Tees, England, assignors to Imperial Chemical Industries Limited, a corporation of Great Britain No Drawing. Application September 8, 1938, Serial No. 228,920. In Great Britain September 29, 1937

3 Claims. (Cl. 260—32)

This invention relates to the manufacture of emulsions of synthetic resins and more particularly to the manufacture of such emulsions which will be useful for treating textiles.

It has been suggested to use synthetic resins for treating textiles for various purposes such as for improving the feel of the textile or for rendering it waterproof, or for bonding layers of fabric together. A particular example of such a bond is where two layers of shirting are bonded to an interlayer which has been impregnated with a resin. When the material is placed in hot water for washing the layers come apart, which facilitates the washing. The subsequent ironing restores the bond.

Such resins must have the following attributes: They should be odourless, colourless, and unaffected by sun or by washing in dilute acids or alkalies; they must be flexible, nonvolatile, insoluble in water, dilute acid, and dilute alkali, and must be in a form easily applied to the textile.

This invention has as an object to provide synthetic resins in such a form that they will have the above properties. A further object is to devise a method of manufacturing such synthetic resins. A still further object is to devise a method of manufacturing textile fabrics treated with such synthetic resins. A still further object is to devise a method of manufacturing doubled and multi-ply fabrics bonded with such synthetic resins. A still further object is to devise a method of manufacturing doubled and multi-ply fabrics which can be made to come apart on washing and the bond restored by ironing. A still further object is to provide such fabrics. Further objects will appear hereinafter. These objects are accomplished by the following invention.

We have found that an aqueous dispersion of the resins obtainable by polymerising together 2-ethyl hexyl methacrylate and methyl methacrylate has all the advantages mentioned above and is suitable for dressing, sizing, and waterproofing textiles, and also for bonding two or more layers of textile material either with or without the use of an interliner.

The following examples illustrate the manufacture of our emulsions but it is understood that they in no way limit our invention.

Example 1

| | Pounds |
|---|---|
| 2-ethyl hexyl methacrylate | 90 |
| Methyl methacrylate | 16 |
| Water | 240 |
| Ammonium persulphate | 0.5 |

The above ingredients were stirred in an enamel lined vessel fitted with reflux condenser and heated to 95° C. for 45 minutes and then cooled to room temperature. A stable aqueous dispersion of the interpolymer was obtained.

Example 2

| | Pounds |
|---|---|
| 2-ethyl hexyl methacrylate | 90 |
| Methyl methacrylate | 10 |
| Water | 200 |
| Ammonium persulphate | 2 |

This mixture was treated as in Example 1, but polymerisation was completed in 30 minutes and gave a product of lower molecular weight. The pH of the emulsion was found to be slightly on the acid side but was adjusted to 7 by addition of caustic soda.

The following example illustrates one method of using our emulsions as bonding and stiffening agents.

Example 3

A light cotton shirting was passed at room temperature through a bath of emulsion prepared according to Example 1, after which it was passed through the rolls of a mangle. It was then dried by festooning in a room at 40° C. for 30 minutes, after which it was again impregnated and treated in similar manner. The cloth had then absorbed 80% of its weight of resin. Bonding was effected by placing the cloth between two printed shirting fabrics and ironing at 125° C.

The bond obtained by this method is broken when the composition is washed in boiling water but is readily re-made by hot ironing and subsequently allowing to cool.

Example 4

| | Pounds |
|---|---|
| 2-ethyl hexyl methacrylate | 70 |
| Methyl methacrylate | 30 |
| Water | 200 |
| Ammonium sulphate | 0.5 |

This mixture was treated as in Example 1. The stable emulsion formed was applied to a leather surface and allowed to dry at room temperature. A tough, glossy, water-resistant, flexible coating was formed.

The invention is not restricted to the proportions of 2-ethyl hexyl methacrylate and methyl methacrylate given in the examples or to any particular type of polymerisation catalyst or dispersing agent.

Example 5

| | Pounds |
|---|---|
| 2-ethyl hexyl methacrylate | 90 |
| Methyl methacrylate | 10 |
| Water | 200 |
| Benzoyl peroxide | 0.5 |
| "Lissapol" C | 3 |

("Lissapol" is a registered trade-mark for dispersing agents well-known in the trade and is a sulphuric acid ester of higher fatty alcohols (cetyl, palmityl, oleyl, and other types.)

The solution of "Lissapol" C and water was heated to 90° C. and the solution of benzoyl peroxide in the methyl methacrylate and 2-ethyl hexyl methacrylate was added slowly with rapid stirring. The mixture was heated under reflux until the exothermic polymerisation reaction started. Stirring was continued until the temperature fell to 60° C. A stable emulsion was formed together with a small amount of agglomerate.

In general as the percentage of 2-ethyl hexyl methacrylate increases the interpolymers become more flexible and also more sticky. If the interpolymer contains less than 40% of 2-ethyl hexyl methacrylate it is deposited on the textile in the form of powdery brittle flakes unless the drying temperature is sufficiently high to cause these flakes to coalesce; above 40% and up to 95% the interpolymers adhere readily to the textiles in film form, an emulsion containing 70% depositing a non-tacky film which is particularly suitable for coating or surface dressing; an emulsion containing 85% is particularly suitable for the bonding of textiles but it is too sticky to serve as a coating or surface dressing.

In applying the emulsion the amount of interpolymer present in the aqueous dispersion will depend upon the nature of the treatment intended. For dressing fabrics and improving the handle thereof, quite dilute emulsions (containing for example about 1% interpolymer) may be employed. For most purposes, however, the emulsions described in Examples 1 and 2 are suitable. If desired, fillers, plasticisers, and other modifying agents may be incorporated in the emulsions. For some purposes it is desirable to use an emulsion of high viscosity or even a paste. Agents such as gelatin, sodium alginate, and water soluble cellulose ethers may be used for thickening. Most of these substances, however, tend to decrease the stability of the emulsion.

These emulsions may be employed for dressing, sizing, and waterproofing textiles and also for bonding together two or more layers of textile material, either with or without the use of an interliner. Other important uses are the treatment of leather surfaces to impart gloss and water resistance, the treatment of paper, wood or metal, and the preparation of flexible films, and water paint, and distempers, and as a heat bonding agent.

Textile materials treated by means of the said emulsions have the following advantages. The presence of the resin in no way affects the appearance of the material since the resin is glass clear and unaffected by sunlight or by washing in dilute acids or alkalies. Owing to its non-volatility and complete insolubility in water, the resin remains permanently on the material which thereby retains all its desirable properties. The treated materials are flexible and their flexibility may be varied by altering the composition of the interpolymer.

As many apparently widely different embodiments of this invention may be made without departing from the spirit and scope thereof, it is to be understood that the invention is not limited to the specific embodiments thereof except as defined in the appended claims.

We claim:

1. A method of manufacturing dispersions of synthetic resins which comprises interpolymerising in aqueous dispersion between 40 and 95 per cent of 2-ethyl hexyl methacrylate and between 60 and 5 per cent of methyl methacrylate.

2. An aqueous dispersion of the resin obtained by the interpolymerization of from 40% to 95% 2-ethyl hexyl methacrylate and from 60% to 5% methyl methacrylate.

3. A fabric base having a coating thereon deposited from an aqueous emulsion of a resin obtained by interpolymerising from 40% to 95% of 2-ethyl hexyl methacrylate and from 60% to 5% methyl methacrylate.

ARCHIBALD RENFREW.
WILLIAM ELLIOTT FREW GATES.